March 3, 1953
J. KILBOURNE
2,630,080
WHEEL HOLDDOWN MECHANISM FOR MINING MACHINE TRUCKS
Filed July 7, 1949
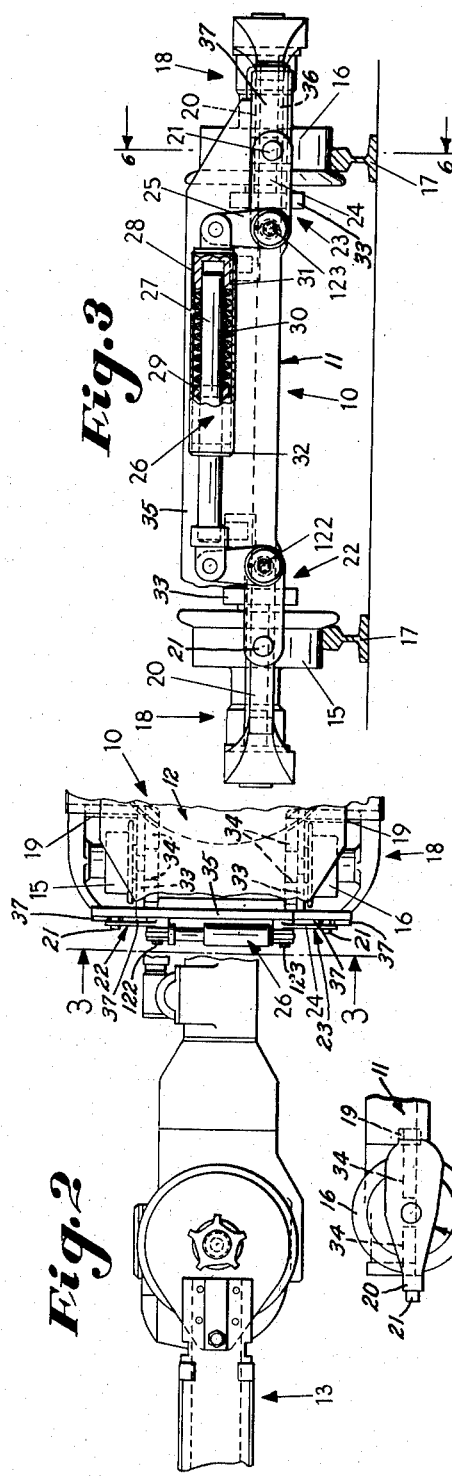
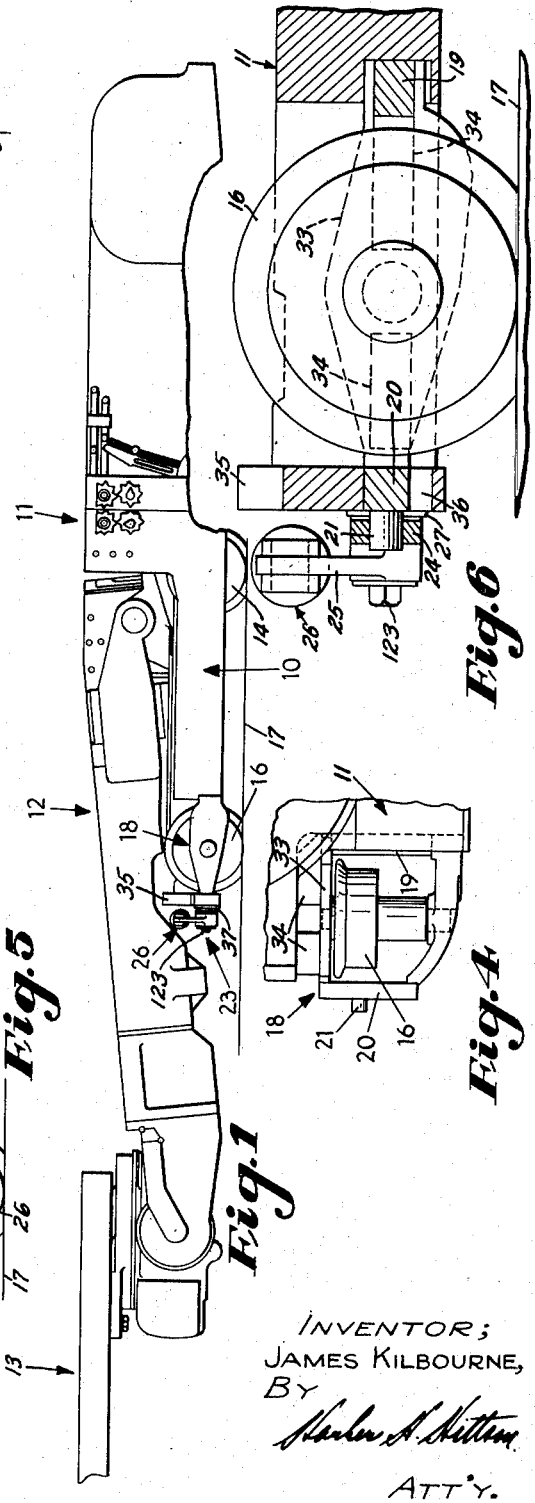
INVENTOR;
JAMES KILBOURNE,
BY
ATT'Y.

Patented Mar. 3, 1953

2,630,080

UNITED STATES PATENT OFFICE 2,630,080

WHEEL HOLD-DOWN MECHANISM FOR MINING MACHINE TRUCKS

James Kilbourne, Bexley, Ohio, assignor to The Jeffrey Manufacturing Company, a corporation of Ohio Application July 7, 1949, Serial No. 103,485

3 Claims. (Cl. 105—210)

This invention relates to a wheel hold-down mechanism for a truck such as that used on a mining machine or the like, and an object of the invention is to provide improved apparatus of the above mentioned type which is very effective to retain the wheels of a truck on the mine rails.

Other objects of the invention will appear hereinafter, the novel features and combinations being set forth in the appended claims.

In the accompanying drawings,

Fig. 1 is a side elevational view of a mining machine having a truck incorporating the features of my invention;

Fig. 2 is a plan view, with parts broken away, showing particularly the front end of the truck and other portions of a mining machine;

Fig. 3 is a view taken substantially on line 3—3 of Fig. 2 showing particularly the hold-down mechanism for the truck front wheels, other parts being omitted and the compressible cross-rod structure being shown partly in section;

Fig. 4 is an enlarged plan view showing particularly the construction of one of the pivoted wheel assemblies;

Fig. 5 is a side elevational view of the wheel assembly shown in Fig. 4; and

Fig. 6 is a view in section, the section being taken substantially on line 6—6 of Fig. 3.

Mining machines are illustrative of machinery which travels over and works while resting upon irregular or uneven mine rails. With such apparatus it is necessary that the wheels be at all times urged against the mine rails with sufficient pressure to prevent derailing while the apparatus is traveling over the rails or while it is standing thereon and performing a mining operation. The invention herein disclosed relates to simple but very effective means for accomplishing this result.

The mining machine illustrated includes a truck 10 which constitutes an integral part of the main frame 11 of the complete mining machine. Mounted upon the truck 10 is an overhanging supplemental frame 12 which is carried by a turntable to provide for its swinging on an upright axis and which is preferably provided with means to swing it on a transverse horizontal axis. At the outer end of the supplemental frame 12 there is a kerf-cutting mechanism 13. The parts so far broadly described may be of standard construction in a coal mining machine and consequently need no detailed description, particularly since their detailed structure forms no part of the present invention.

The truck 10 includes a pair of rear track engaging wheels, one of which is seen at 14, and a pair of front track engaging wheels 15 and 16. All the wheels 14, 15 and 16 are adapted to run on rails 17.

The rear wheels 14 are held to the truck 10 against movement except for their free rotation. The front wheels 15 and 16, on the other hand, are each mounted for up and down movement on a transverse horizontal axis. To this end, each of the wheels 15 and 16 is carried in a single structure, that associated with wheel 16 being now described in detail.

The axle of wheel 16 is carried at opposite ends in bearings provided in a box-like frame 18 which has a rear bar 19 extending into a groove or pivot means in the cut-out front corner of the truck frame 11 so that the frame 18 and wheel 16 are free to pivot about the horizontal axis of said pivot bar 19. The inner plate 33 of the frame 18 is adapted to rub against an adjacent portion 34 of the truck frame 11, as clearly illustrated in Fig. 4 of the drawings. The front member of the frame 18 includes a bar or plate 20 provided with a pivot boss 21 which extends along an axis parallel with the longitudinal axis of the truck 10 and which is horizontal.

As seen in Figs. 1, 2, 3 and 6, the front end of the main frame 11 has a cross plate 35, the ends of which are slotted, as seen in Figs. 3 and 6 at 36 to receive the front bars or plates 20 of the box-like frames 18. Each slot 36 in the cross plate 35 is partially closed at its front by a pair of plates 37 welded to the cross plate 35 and spaced to provide an opening through which the pivot boss 21 of the box-like frame 18 extends and can move as the frame 18 moves up and down.

From the description thus far given it will be seen that each front wheel 15 and 16 is carried individually by a box-like frame 18 and that each of these frames 18 is pivoted at its rear end for vertical swinging movement about the axis of the rear bar 19. It will also be apparent that the front bar or plate 20 is received in the slot 36 in cross plate 35. Forward movement of the box-like frames 18 is prevented by the plates 37 which abut the fronts of the cross bars 20, and the top abutment surface of the front bar 20 of each box-like frame 18 normally abuts the top or downwardly facing abutment surface of the slot 36. Thus if the truck is running over or resting upon level rails a great portion of the load carried by each of the wheels is transmitted directly to the main frame 11 through the rear pivot bar 19 and the front bar 20 engaging the upper abutment surface of slot 36 in cross plate 35.

Associated with each of the two frames 18 there is a bell crank, that on the left, adjacent wheel 15, being designated 22 and that on the right, adjacent wheel 16, being designated 23. Bell cranks 22 and 23 are of similar construction. Each has a normally horizontal arm, that associated with wheel 16 being designed 24. This bell crank lever, like its companion, also has an upstanding arm 25. The two bell crank levers 22 and 23 are mounted for pivotal adjustment on spaced horizontal axes parallel with the longitudinal axis of the truck 10 by pivot bolts 122 and 123 rigidly attached to the cross plate 35 of main frame 11.

A horizontal transversely extending cross-rod assembly 26 is pivotally attached at opposite ends to the upwardly extending arms of the bell cranks 22 and 23. The cross-rod assembly 26 is resiliently constructed in that there is a piston rod 27 connected to the bell crank 22 which extends into a cylinder 28 connected to the bell crank 23.

The piston rod 27 has a ring 29 welded thereto, constituting one abutment for a compression spring 30, the other end of which abuts a guide sleeve 31 which slidably receives the piston rod 27 and is rigidly attached to the right-hand end of the cylinder 28. The left-hand end of the cylinder 28 is provided with a guide ring 32 through which the piston rod 27 extends.

In the operation of the device, either of the wheels 15 and 16 is free to swing downwardly with respect to the main frame thereby transferring the load from one to the other. For example, if the wheel 15 moves down it will pivot about the transverse horizontal axis provided by the rear bar 19 of its associated box 18. This will swing the normally horizontal arm of the bell crank 22 downward and swing the normally vertical arm thereof outward. This motion will be transmitted to the resilient rod 26. The resiliency of the cross-bar 26 is desirable to take momentary shocks and to compensate for short duration irregularities between the rails 17. It also acts as a cushioning means for the truck 10, but its most important function is that of a hold-down device for applying pressure to either wheel 15 or 16 to hold it positively upon the rail when the wheel drops to follow an uneven rail. Thus the wheel is always held against the rail by the spring action of the cross-rod even though the wheel is actually supporting but little of the weight of the truck.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A machine including a truck frame having a pair of front rail engaging wheels and a pair of rear rail engaging wheels, a pair of box-like frames, one mounting each wheel of a pair of said wheels at opposite sides of said truck frame, cooperating pivot means on said box-like frames and said truck frame mounting said box-like frames and wheels for pivotal movement about transverse axes, cooperating abutment means on said box-like frames and said truck frame preventing upward movement of the former when said truck is on even rails, a bell crank for each box-like frame pivotally mounted on said truck frame on spaced longitudinal axes at right angles to said transverse axes, each said bell cranks having an outwardly extending arm pivotally connected to one of said box-like wheel mounting frames on a longitudinal axis and having an upwardly extending arm, and a normally horizontal compressible rod pivotally attached at opposite ends to the two upwardly extending arms of said bell cranks, said compressible rod urging said box-like frames and wheels downwardly at all times whereby when one of said wheels moves downwardly to follow an uneven rail it is held thereagainst by said compressible rod.

2. A machine including a truck frame having a pair of front rail engaging wheels and a pair of rear rail engaging wheels, a pair of frames, one mounting each wheel of a pair of said wheels at opposite sides of said truck frame, cooperating pivot means on said frames and said truck frame mounting said frames and wheels for pivotal movement about transverse axes, cooperating abutment means on said frames and said truck frame preventing upward movement of the former when said truck is on even rails, a bell crank for each frame pivotally mounted on said truck frame on spaced longitudinal axes at right angles to said transverse axes, each said bell cranks having an outwardly extending arm pivotally connected to one of said wheel mounting frames on a longitudinal axis and having an upwardly extending arm, and a normally horizontal compressible rod pivotally attached at opposite ends to the two upwardly extending arms of said bell cranks, said compressible rod urging said frames and wheels downwardly at all times whereby when one of said wheels moves downwardly to follow an uneven rail it is held thereagainst by said compressible rod.

3. A machine including a truck frame having a pair of front rail engaging wheels and a pair of rear rail engaging wheels, a pair of frames each mounting one wheel of one pair of said wheels, cooperating pivot means on said wheel mounting frames and said truck frame mounting said wheel mounting frames and wheels for pivotal movement, abutment means on said truck frame preventing upward movement of said frames when said truck is on even rails, a bell crank for each wheel supporting frame pivotally mounted on said truck frame each having an arm engaging one of said wheel supporting frames and a second arm, and spring means interposed between said second arms of the bell cranks urging said wheel mounting frames and wheels downwardly at all times whereby when one of said wheels moves downwardly to follow an uneven rail it is held in engagement therewith by said spring.

JAMES KILBOURNE.

REFERENCES CITED

The following references are of record in the file of this patent:

UNITED STATES PATENTS

| Number | Name | Date |
| --- | --- | --- |
| 903,080 | Granieri | Nov. 3, 1908 |
| 1,974,018 | Edmunds | Sept. 18, 1934 |
| 2,007,254 | Pray | July 9, 1935 |
| 2,071,502 | Dalton | Feb. 23, 1937 |
| 2,097,968 | Edmunds | Nov. 2, 1937 |